(12) United States Patent
Duquette

(10) Patent No.: US 6,253,644 B1
(45) Date of Patent: Jul. 3, 2001

(54) TORQUE WRENCH

(75) Inventor: David M Duquette, San Jose, CA (US)

(73) Assignee: David M. Duquette, San Jose, CA (US)

( * ) Notice: Subject to any disclaimer, the term of this patent is extended or adjusted under 35 U.S.C. 154(b) by 0 days.

(21) Appl. No.: 09/514,131

(22) Filed: Feb. 28, 2000

Related U.S. Application Data
(60) Provisional application No. 60/122,348, filed on Mar. 2, 1999.

(51) Int. Cl.$^7$ ................................................. B25B 13/00
(52) U.S. Cl. .......................... 81/57.36; 81/57.22; 81/57
(58) Field of Search ............................... 81/57.36, 57.22, 81/57

(56) References Cited

U.S. PATENT DOCUMENTS 2,964,152 * 12/1960 Banner .
3,757,613 * 9/1973 Arndt et al. .
4,515,043 * 5/1985 Gray .
4,970,918 * 11/1990 Brewer et al. .
5,813,298   9/2000 Beattle .

* cited by examiner

*Primary Examiner*—Joseph J. Hail, III
*Assistant Examiner*—Willie Berry, Jr.

(57) ABSTRACT

A torque wrench interfaces with a one or more fasteners intended to be tightened or loosened and includes a main housing with two or more preset torque devices which establishes a torque range insuring that the fasteners will not be tightened neither too tight nor too loose. A drive shaft protrudes from the main housing and rotatably drives a drive gear disposed in the main housing in which when rotated, drives the geared torque devices positioned on either side of the drive gear. A helical spring connects two torque pistons and adjustably applies a regulated torque to the driven torque piston in response to movement of the drive torque piston. The torque pistons are in a torque piston casing and are connected by irregular opposing surfaces urged together by the helical spring that allow for the torque pistons to rotate in relation to each other in one rotational direction only and allows the preset torque device to be enabled only when tightening a fastener in the clockwise direction. When the torque device is turned in the counter clockwise direction the surfaces lock together disabling the preset torque limit allowing the fastener to be loosened regardless to how much torque is applied to the fastener.

7 Claims, 5 Drawing Sheets

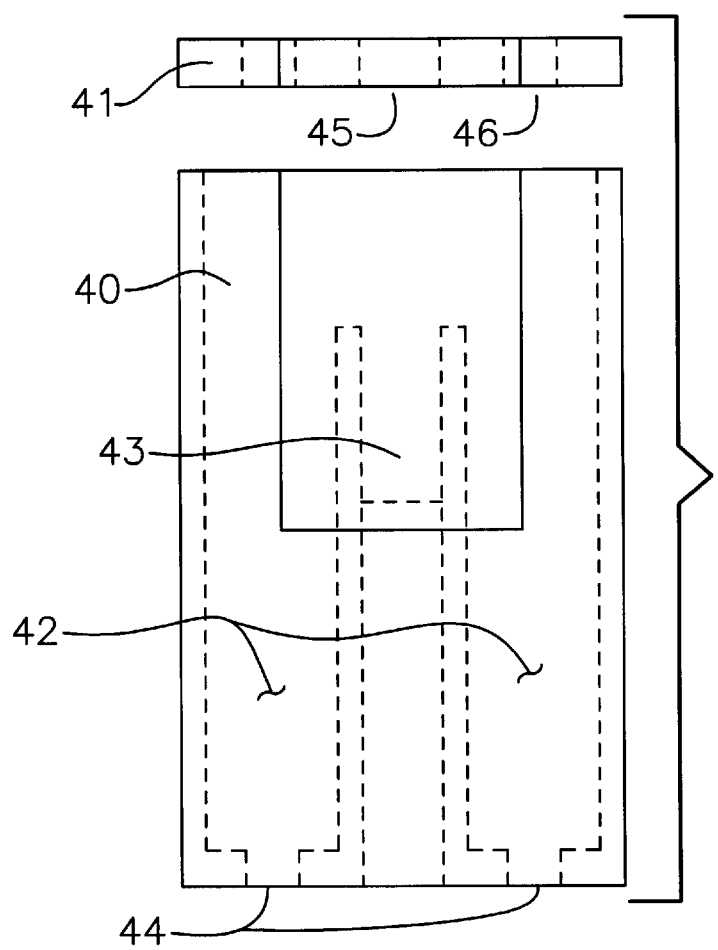
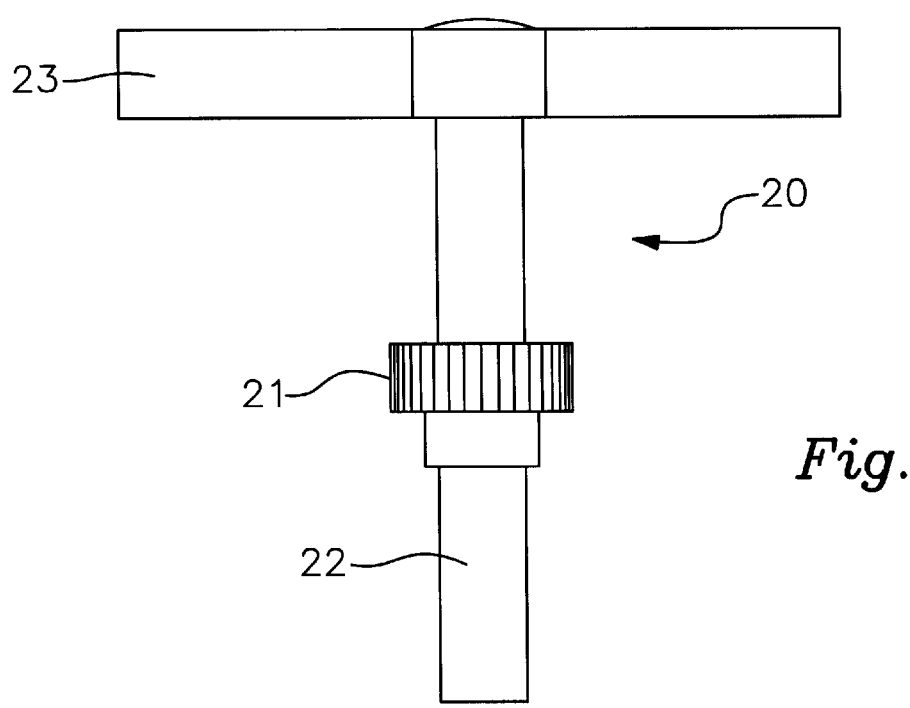

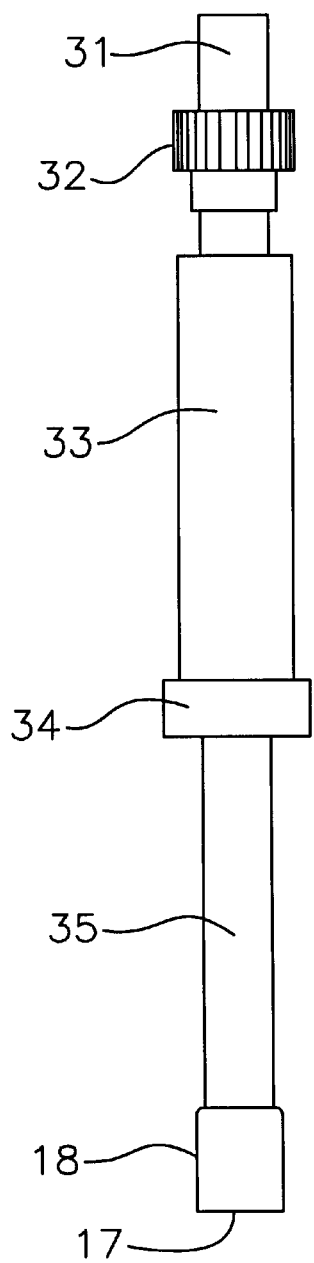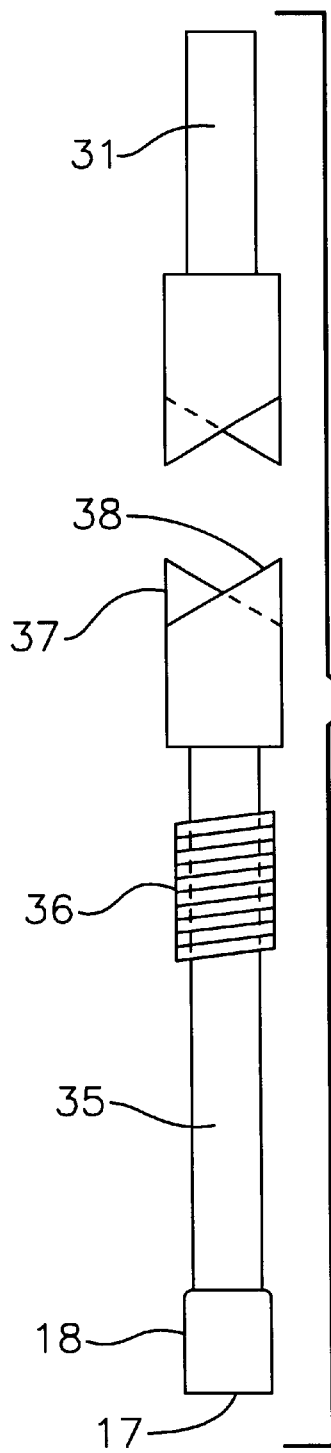
Fig. 3
Fig. 4

TORQUE WRENCH

This Appln claims the benefit of Provisional Ser. No. 60/122,348 filed Mar. 2,1999.

BACKGROUND OF THE INVENTION

This invention relates generally to the field of torque wrenchs, and more particularly to a novel torque wrench designed to tighten one or more fasteners simultaneously to a certain torque specification.

Conventionally, a variety of torque wrenches have been employed in various mechanical assembling operations to tighten nuts and bolts rapidly and at the same time, to ensure that the parts have been joined together to produce a desired holding action without applying an excessive degree of torque which would tend to weaken or fracture the threads or holding elements of the parts being tightened. Various attempts have been employed to supply special torque wrenches to operate in connection with tightening of parts whereby the degree of torque applied by a wrench is indicated either visually or by feel. Devices of this character tend to increase the coordination and efficiency of the operator and it has been found desirable to provide means, which will indicate automatically when the selected amount of torque has been applied. This desired indication is usually assembled or constructed with a torque wrench itself, which includes a handle grip of the wrench so that the operator will be alerted to the amount of torque being applied.

Further problems have been encountered when employing conventional torque wrenches with certain specialized operations such as two fastener clamps used in many plumbing operations; Specifically, a no hub coupler used to join two sections of pipe. These problems stem largely from the fact that conventional wrenches allow the operator to only tighten one fastener at a time. When the two fasteners on a no hub coupler are not tightened simultaniously it can cause the coupler to buckle on one side and increase the risk of leaking. Furthermore, to insure the fasteners are tightened evenly the operator must constantly switch from one fastener to another while tightening the coupler making the process very slow and inefficient. It is also necessary to have the ability to loosen a fastener, though most conventional torque wrenches will not reverse a fastener without engaging the torque limit action that would hinder such loosening.

SUMMARY OF THE INVENTION

The primary object of the invention is to provide a novel torque device to simultaneously tighten one or more fasteners to a predetermined torque specification.

Another object of the invention is to provide a novel torque device in which one fastener can be tightened to its predetermined torque limit and stop while still allowing another fastener to continue tightening till it reaches its torque limit.

Another object of the invention is to provide a novel torque device, which will loosen a fastener without engaging the torque limit device.

Another object of the invention is to provide a novel torque device with a multiplying gear in which drives and increases the speed as to which the fasteners are tightened or loosened.

Yet another object of the invention is to provide a novel torque device able to ratchet in the forward and reverse directions.

In accordance with a preferred embodiment of the present invention, a torque wrench comprises a main housing disposes two or more single torque devices and a drive gear. One end of each of the single torque devices protrudes from the main housing and is intended to insertably receive the fastener intended to be tightened, on the opposing end of the main housing a ratcheting drive shaft protrudes from the main housing and drives a drive gear which is operable connected to a driven gear affixed to each single torque device.

Several drive gears can be used to link numerous torque devices together in order to loosen or tighten numerous fasteners simultaneously.

In the illustrated embodiment, the torque device provides a preset torque means, which establishes a torque range ensuring that the fastener will not be tightened either too tight or too loose. In one form this means is a helical spring which bears against two pistons arranged in rotary sliding relationship with respect to each other in the clockwise direction only allowing the fasteners to be loosened with out any torque limits. Also, the drive gear is sized larger than the driven gears affixed to the single torque devices, which multiplies the speed that the fastener is tightened in relation to the speed that the drive gear is turned.

Since the drive gear drives two separate torque devices this allows each fastener to be tightened independent of the other. Therefore, if one fastener is initially tighter than the other it will reach its designed torque limit first and stop turning while the other continues until it reaches its designed torque limit.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 2 is a plan view of the torque wrench housing and housing cover of FIG. 1.

FIG. 3 is a plan view of the torque device of FIG. 1.

FIG. 4 is a plan view of the parts held within the torque piston casing of FIG. 3.

FIG. 5 is a plan view of the drive assembly of FIG. 1.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
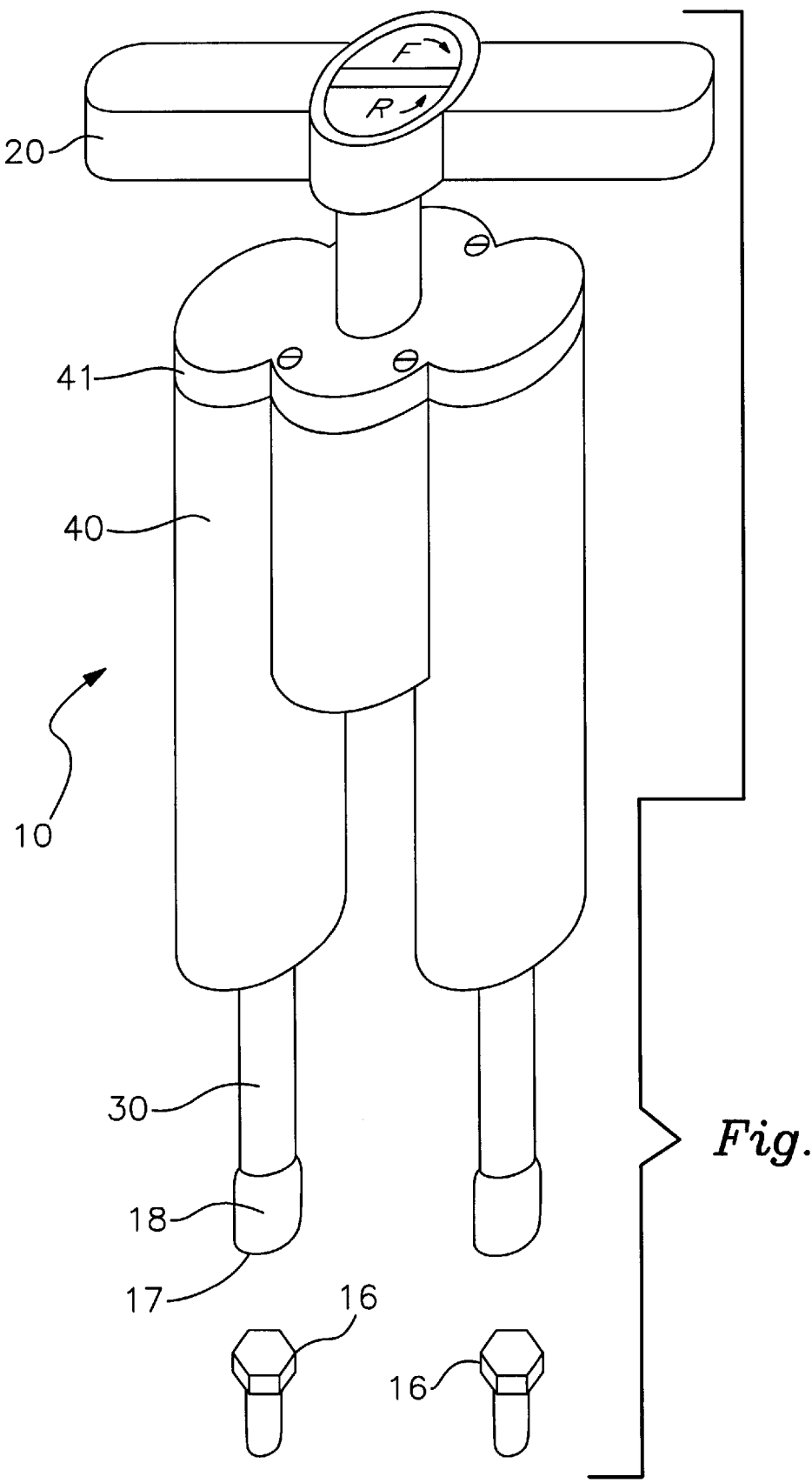
FIG. 1 is a perspective view of a torque wrench in accordance with a preferred embodiment of the present invention.

In accordance with the preferred embodiment of the invention shown in the front perspective view in FIG. 1, the novel torque wrench of the invention generally denoted by the numeral 10 has two fasteners 16 intended to be tightened engaged into hexagon shaped recess 17 on one end of socket 18. Main body 40 disposes two single torque devices 30 which protrude from the lower end of main body 40. Main body cover 41 is secured to main body 40 and has a hole in which the drive assembly 20 extends from.

In FIG. 2, main body 40 of the invention shown from the plan view has two torque cavities 42 which dispose two single torque devices 30. These single torque devices protrude from main body 40 through two positioning holes 44 that rotatably hold the lower end of the single torque devices in place. An additional drive assembly cavity 43 disposes and rotatably holds the lower end of the drive assempy 20, and is centered between two single torque devices 30.

Main body cover 41 is secured to the top of main body 40 and has positioning hole 45 that rotatably holds the upper end of drive assembly 20 as it passes through positioning hole 45. Equal distance from positioning hole 45 and directly opposite and in line with positioning holes 44 are two circular depressions 46 that rotatably hold the upper end of the single torque devices.

In FIG. 3, single torque device 30 is shown in the plan view. Drive torque piston 31 and driven torque piston 35 are disposed in torque piston casing 33, generally cylindrical in shape. On the upper end of torque piston casing 33 there is a small hole which allows drive torque piston 31 to protrude from, while still holding it within, the torque piston casing. There is casing cap 34 that is secured to the lower end of torque piston casing 33 which also has a small hole that allows driven torque piston 35 to protrude from while still holding it within, torque piston casing 33. Secured to upper end of drive torque piston 31 but outside of torque piston casing 33 there is a driven gear 32 which is designed to mesh with drive gear 21, shown in FIG. 5. The driven gear is sized smaller than said drive gear, which will multiply the number of rotations of the driven gear in relation to the rotations of the drive gear. Driven gear 32 when rotated drives torque device 30.

In FIG. 4, the parts held within torque piston casing 33 are shown in plan view. Drive torque piston 31 and driven torque piston 35 are urged together and into mesh by helical spring 36. It is to be noted that the opposing surfaces urged into mesh of the drive torque piston and driven torque piston constitute a series of sloping ramps 38 and vertical walls 37. The drive torque piston and the driven torque piston are intended to move together in unison when rotated clockwise until such time as the spring tension exerts itself to cause relative movement between the drive and driven torque pistons to change, forcing sloping ramps 38 to roll over each other. When the drive and driven torque pistons are rotated counter clockwise, vertical walls 37 lock together causing the drive and driven torque pistons to move in unison regaurdless of the torque exerted on single torque device 30. Socket 18 is located at the lower end of driven torque piston 35 and has hexigon shaped recess 17 on the bottom of socket 18 intended to insertably receive a fastener intended to be tightened or loosened.

In FIG. 5, drive assembly 20 is shown in the plan view. Drive gear 21 is affixed to drive assembly shaft 22. Drive gear is sized to mesh between the two driven gears 32. The drive gear is also sized larger the driven gears which will multiply the number of rotations of torque devices 30 in relation to the rotation of drive gear 21. T-handle ratchet 23 is a standard forward and reverse rachet which when rotated drives the drive gear.

Figure 6:
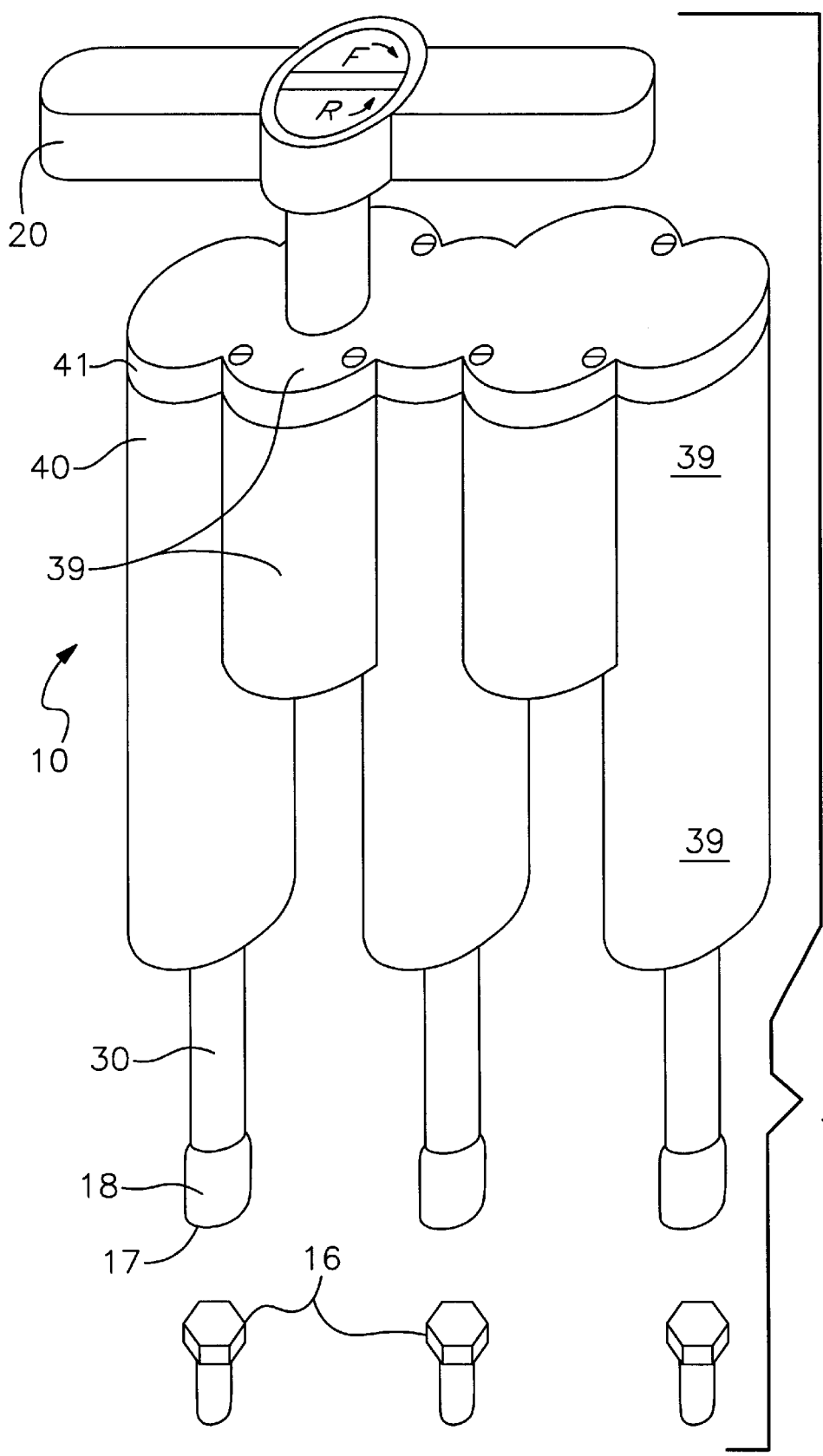
FIG. 6 is a perspective view of a extended torque wrench embodiment of the present invention.

In FIG. 6, another embodiment of the invention is shown in the perspective view. By enlarging the main body to comprise an additional drive gear 21 and torque device 30 the torque wrench 10 is able to interact with three fasteners 16. This same modification can be made several times to accommodate any number of fasteners. Bearings 39 can also be added to the upper and lower sections of each torque device and drive gear in order to reduce friction and promote smooth operation.

Figure 7:
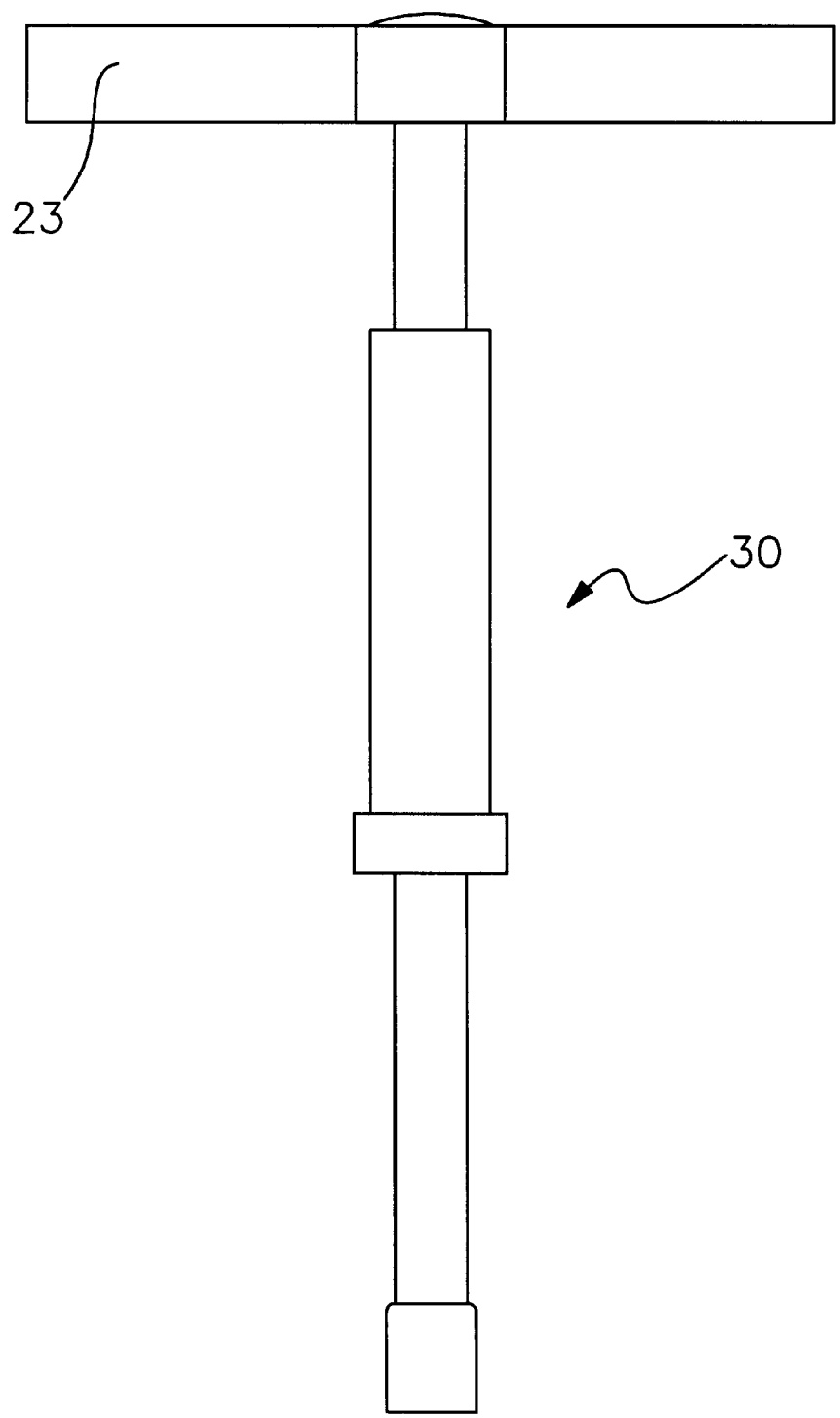
FIG. 7 is a plan view of a single torque wrench embodiment of the present invention.

In FIG. 7, another embodiment of the invention is shown in the plan view. By taking a single torque device 30 and adding a standard T-handle ratchet 23 with a forward and reverse to the upper end of the drive torque piston 31 a single torque wrench is created.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Dual torque wrench comprising:

a main housing;

two or more single torque wrenches disposed in said main housing and protruding through one open end of said main housing;

one or more drive gears disposed in said main housing;

driven gears affixed to said single torque wrenches and operable connected through said drive gear;

a drive shaft protruding through said main housing and connected to said drive gear;

said single torque wrench comprises:

a torque piston casing;

a drive and driven torque piston disposed in and protruding from each end of said torque piston casing having irregular opposing surfaces urged together by a resilient means with a pre selected spring rate;

said resilient means operably connect said torque pistons to adiustably applt a regulated torque to said driven torque piston in response to movement of said drive torque piston.

2. Dual torque wrench as claimed in claim 1, wherein said resilient means is a helical spring.

3. Dual torque wrench as claimed in claim 1 wherein said drive gear is rotatably affixed within said main housing and connected to said drive shaft.

4. A torque wrench comprising:

a torque piston casing;

a drive and driven torque piston disposed in and protruding from each end of said torque piston casing having irregular opposing surfaces urged together by a resilient means;

a resilient means carried in said torque piston casing expanding against said driven torque piston and a torque piston casing cap and wherein said resilient means include a pre-selected spring rate;

said torque piston cap attached to one end of said torque piston casing; and means operable connect said torque pistons to adjustably apply a regulated torque to said driven torque piston in response to movement of said drive torque piston.

5. A torque wrench as claimed in claim 4 wherein said irregular opposing surfaces is a series of sloping ramp surfaces followed by a vertical surface radiating outwardly from the center of each of said drive and driven torque pistons to allow the torque pistons to rotate in relation to each other in one rotational direction only.

6. A torque wrench as claimed in claim 4 wherein said resilient means is a helical spring.

7. A torque wrench as claimed in claim 5 wherein said resilient means is a helical spring.

* * * * *

UNITED STATES PATENT AND TRADEMARK OFFICE
CERTIFICATE OF CORRECTION

PATENT NO. : 6,253,644 B1
DATED : July 3, 2001
INVENTOR(S) : David M. Duquette

Page 1 of 1

It is certified that error appears in the above-identified patent and that said Letters Patent is hereby corrected as shown below:

<u>Column 3,</u>
Line 65, change "Larger the" to -- Larger than the --

<u>Column 4,</u>
Line 44, change "applt" to -- apply --
Line 64, change "operable" to -- operably --

Signed and Sealed this

Fifth Day of March, 2002

Attest:

JAMES E. ROGAN
*Attesting Officer*     *Director of the United States Patent and Trademark Office*